(12) United States Patent
El-Wakeel et al.

(10) Patent No.: US 10,315,553 B2
(45) Date of Patent: Jun. 11, 2019

(54) EXPANDABLE KIOSK STRUCTURE WITH PUBLIC SERVICE ELEMENT

(71) Applicant: Imam Abdulrahman Bin Faisal University, Dammam (SA)

(72) Inventors: Hala El-Wakeel, Dammam (SA); Semah Alabduljabbar, Dammam (SA); Zati Hazira Ismail, Dammam (SA); Muneera A. Albarrak, Dammam (SA); Shahad Al-Shuaibi, Dammam (SA); Haifa Alarifi, Dammam (SA); Mashaer Alabdullah, Dammam (SA); Reem Alba'Adi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 15/814,758

(22) Filed: Nov. 16, 2017

(65) Prior Publication Data

US 2018/0274255 A1   Sep. 27, 2018

Related U.S. Application Data (60) Provisional application No. 62/474,144, filed on Mar. 21, 2017.

(51) Int. Cl.
*B60P 3/025* (2006.01)
*E04H 1/12* (2006.01)
(Continued)

(52) U.S. Cl.
CPC ............ *B60P 3/0257* (2013.01); *A47F 5/108* (2013.01); *A47F 9/00* (2013.01); *A47F 10/00* (2013.01);
(Continued)

(58) Field of Classification Search
CPC ............ E04B 1/34363; E04B 1/34352; E04B 1/3205; E04B 2001/327; E04B 2001/0061;
(Continued)

(56) References Cited

U.S. PATENT DOCUMENTS 2,791,323 A * 5/1957 Schreckengost .... B41F 13/0024
101/480
2,870,459 A * 1/1959 Zabielski ............... A47C 17/50
312/201

(Continued)

FOREIGN PATENT DOCUMENTS

| CN | 202248971 U | 5/2012 |
|---|---|---|
| CN | 204098537 U | 1/2015 |
| WO | 97/38188 A1 | 10/1997 |

*Primary Examiner* — Hanh V Tran
(74) *Attorney, Agent, or Firm* — Oblon, McClelland, Maier & Neustadt, L.L.P.

(57) ABSTRACT

An expanded kiosk and kiosk system that is collapsible and deployable by expansion and contraction. The kiosk includes a lighting system adapted to provide a light characteristic to the kiosk and represent a lamp post or light post for public or private spaces. Deployment of the kiosk includes moving first and second vertically-oriented structural units away from one another such that one or more of a canopy, a working surface and/or a front-facing surface are fully deployed and the canopy surface and working surface are substantially parallel to one another.

6 Claims, 6 Drawing Sheets

(51) Int. Cl.

| | |
|---|---|
| *A47F 5/10* | (2006.01) |
| *B62B 3/02* | (2006.01) |
| *B62B 5/00* | (2006.01) |
| *E04H 15/40* | (2006.01) |
| *E04H 15/54* | (2006.01) |
| *E04H 15/56* | (2006.01) |
| *A47F 10/00* | (2006.01) |
| *A47F 11/02* | (2006.01) |
| *B62B 3/00* | (2006.01) |
| *E04B 1/343* | (2006.01) |
| *E04F 10/02* | (2006.01) |
| *A47F 9/00* | (2006.01) |
| *A47B 31/00* | (2006.01) |
| *E04B 1/32* | (2006.01) |
| *E04B 1/00* | (2006.01) |

(52) U.S. Cl.
CPC .............. *A47F 11/02* (2013.01); *B62B 3/005* (2013.01); *B62B 3/02* (2013.01); *B62B 5/0013* (2013.01); *E04B 1/34352* (2013.01); *E04B 1/34363* (2013.01); *E04F 10/02* (2013.01); *E04H 1/1222* (2013.01); *E04H 15/40* (2013.01); *E04H 15/54* (2013.01); *E04H 15/56* (2013.01); *A47B 2031/002* (2013.01); *A47B 2031/003* (2013.01); *A47B 2031/008* (2013.01); *E04B 1/3205* (2013.01); *E04B 2001/0061* (2013.01); *E04B 2001/327* (2013.01)

(58) Field of Classification Search
CPC .............. A47B 5/108; A47B 2031/002; A47B 2031/003; A47F 5/108; A47F 10/00; A47F 11/02; B60P 3/0257; B62B 3/005; B62B 3/02; B62B 5/0013; E04F 10/02; E04H 1/1222; E04H 15/40; E04H 15/54; E04H 15/56
See application file for complete search history.

(56) References Cited

U.S. PATENT DOCUMENTS

| | | | | |
|---|---|---|---|---|
| 3,087,767 | A * | 4/1963 | Schell | A47B 85/08 312/239 |
| 3,629,982 | A * | 12/1971 | Ballay | E04B 1/3444 135/115 |
| 3,936,110 | A * | 2/1976 | Meggs | A47B 46/00 312/241 |
| 3,984,949 | A * | 10/1976 | Wahlquist | E04B 1/3445 52/70 |
| 4,270,319 | A * | 6/1981 | Spasojevic | B60P 3/0257 296/22 |
| 4,417,774 | A * | 11/1983 | Bevan | A47F 9/00 312/108 |
| 5,489,938 | A * | 2/1996 | Maruyama | H04N 5/64 312/223.3 |
| 5,718,494 | A * | 2/1998 | Luddemann | A47F 3/004 312/114 |
| 5,916,096 | A * | 6/1999 | Wiesmann | E04H 15/008 135/139 |
| 5,964,065 | A * | 10/1999 | Migurski | E04H 3/08 52/64 |
| 5,996,740 | A * | 12/1999 | Wells | A47B 53/00 186/57 |
| 7,464,946 | B2 * | 12/2008 | Marklevitz | A47B 47/0075 280/47.26 |
| 2014/0052463 | A1 | 2/2014 | Cashman et al. | |
| 2014/0300087 | A1 * | 10/2014 | Bell | B62B 3/002 280/651 |
| 2014/0330579 | A1 * | 11/2014 | Cashman | E04H 1/1222 705/2 |
| 2017/0042325 | A1 | 2/2017 | Tulli et al. | |
| 2018/0274256 | A1 * | 9/2018 | El-Wakeel | B62B 3/005 |

* cited by examiner

EXPANDABLE KIOSK STRUCTURE WITH PUBLIC SERVICE ELEMENT

CROSS-REFERENCE TO RELATED APPLICATIONS

The present application claims priority to U.S. Provisional Application No. 62/474,144, having a filing date of Mar. 21, 2017, incorporated herein by reference in its entirety.

BACKGROUND OF THE INVENTION

Field of the Invention

The present disclosure relates to an expandable structure that functions as a vending location, distribution point and/or service location, and includes a public service element such as a light source, architectural element or display surface.

Description of the Related Art

Public spaces and gathering areas where events occur and/or individuals meet in groups are valued by vendors and distributors for heir proximity to and ease of access to a customer base. However, such spaces and areas are often characterized by only periodic or irregular visitation by significant numbers of individuals. Visitation often coincides only with special public events, private events or environmental conditions such as good weather. One example of such public gathering spaces is a beachfront area such as a boardwalk, corniche, or promenade. Visits to beach areas by the public occur at irregular times such as on the weekend, during pleasant weather or on occasions of particular public interest. As a consequence, a public presence in numbers sufficient to support installation of a full time permanent retail structure occurs only irregularly.

During times of public visitation and/or when many individuals are present there is a need for refreshments, information, medical service and/or other retail or government service. Retailers may offer for sale souvenirs or refreshments while government bureaus may gather or disseminate information. Food and refreshment vendors are a desirable presence in public gathering spaces during periods of high visitation.

Providing the necessary structure for food vendors and vendors of retail goods and/or services in public gathering spaces is complicated by irregular visitation. While some public spaces such as indoor shopping malls have a reliable and steady stream of potential customers, other public spaces, especially outdoor gathering spaces such as beachfront areas, experience much greater variance in visitation by individuals that represent a potential customer base. For this reason it is difficult to make a case to support the investment needed to build and/or install permanent fully staffed retail structures in such spaces.

In the past a common solution to this problem was for vendors to provide retail and/or vendor services through mobile food dispensers or cart-based vendor systems. A cart-based vendor system permits a vendor to maximize productivity from a retail structure by permitting the vendor to move the structure and provide service to the greatest number of individuals. Mobility permits the vendor to go to the customer base rather than wait for a customer base to appear at a permanent retail facility.

However, cart-based food service and information service options suffer from a series of drawbacks. Often such carts are in need of repair and present an unsanitary and/or unprofessional appearance. The entrepreneurial nature of low profit refreshment vending often leads irresponsible vendors to cut corners and ignore public health regulations. In addition, it becomes more difficult to regulate business activity when it is easy for the vendors to quickly move and avoid scrutiny.

Further, cart-based systems or other temporary retail locations are typically self-serving for the vendor and offer little public benefit other than the availability of retail services. Public spaces are presently under pressure for economic reasons and are often in need of infrastructure improvements and/or utility maintenance that demand substantial expenditures and management effort.

SUMMARY OF THE INVENTION

In one aspect the present disclosure relates to an expandable kiosk structure that provides a vendor preparation space and/or display space, and concurrently provides one or more desirable public services such as lighting, architectural enhancement and/or beneficial structural characteristics or functionalities. The expandable kiosk structure of this aspect of the disclosure provides a vending and/or service space for one or more individuals wishing to make services and/or products available for sale in an area that ordinarily experiences only irregular or variable visitation by one or more individuals.

In another aspect of the invention the expandable kiosk structure is expandable from a closed or collapsed position in which the expandable kiosk structure has a different architectural or utility function into an expanded or deployed form in which the expandable kiosk structure provides a vending space, optionally with utility features.

In a further aspect of the invention the expandable kiosk structure has two portions that are pivotally and/or hingeably connected to provide a collapsed configuration and an expanded configuration.

A further aspect of the invention includes an expandable kiosk system that contains the expandable kiosk structure and an anchoring mechanism configured to hold a rolling mechanism mounted to a vertically-oriented structural unit at a distance from another vertically-oriented structural unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Aspects and embodiments of the present disclosure will now be described more fully with reference to the accompanying drawings, in which some, but not all of the embodiments of the disclosure are shown. In addition, the present disclosure will be understood with reference to the following definitions.

As used herein, the words "a" and "an" and the like carry the meaning of "one or more". With the description of this disclosure, where a numerical limit or range is stated, the end points are included unless stated otherwise. Also, all values and sub-values including subranges within a numerical limit or range are specifically included as explicitly written out.

The term "comprising" is considered an open-ended term synonymous with terms such as including, containing or having, and is used herein to describe aspects of the invention which may include additional components, functionality and/or structure. Terms such as "consisting essentially of" are used to identify aspects of the invention which exclude particular components that are not explicitly recited in the claim but would otherwise have a material effect on the basic and novel properties of the disclosure. Basic and novel properties of the present disclosure include the ability to collapse, close or retract a kiosk-type structure, the suitability of the structure as a vending point, the suitability of the structure to provide architectural features and/or utility features in public and/or private spaces, such as lighting or display. The term "consisting of" describes aspects of the invention in which only those features explicitly recited in the claims are included and thus other components not explicitly or inherently included in the claim are excluded.

A preferred embodiment of the invention includes an expandable kiosk structure that functions to provide a vending space, vending point, serving point, meeting space, dissemination space or interaction point between two or more individuals. Preferably the expandable kiosk structure functions as a temporary storefront for a vendor of articles such as food service items. The expandable kiosk structure may also be used for disseminating information such as literature described in tourist information, health information and the like.

A preferred functionality of the expandable kiosk structure relates to providing a formal structure or interaction point for a vendor (herein the term "vendor" can refer to an individual in a retail service capacity or public service capacity) and an individual seeking to make a purchase from the vendor or obtain services from the vendor. Although the expandable kiosk structure is preferably used in an area that experiences periodic or irregular visitation, and is preferably in an outdoor setting, it may likewise he used in an indoor setting and/or in a setting, such as a shopping mall, where visitation and exposure to the public or to a group of potential customers is regular and/or predictable.

The term "kiosk" and/or "kiosk-type" is used herein to describe a structure which functions as a storefront that can readily accommodate one or more individuals in a retail or vendor-type function and/or to provide services and/or sales to the general public or to any other group of individuals. As used herein this term does not require that the vendor is fully encased by the structure, fully covered by the structure or otherwise within particular perimeter of the structure. Preferably at least two individuals are involved in a retail transaction involving the expandable kiosk structure, i.e., a vendor and a buyer (customer). A vendor is generally located within the expandable kiosk structure and a buyer (customer) is generally located in front of the vendor and in front of the expandable kiosk structure.

The expandable kiosk structure is "temporary" in that it may be expanded and collapsed to mimic the "opening" and "closing" of a typical conventional indoor retail establishment. The kiosk is "open for business" when it is in a fully expanded or deployed configuration and "closed for business" when it is in a retracted, collapsed or closed configuration.

In addition to providing a retail and/or temporary retail functionality, the expandable kiosk structure may additionally function to provide a display space and/or advertising space on one or more exterior surfaces. The display spaces may include conventional hard surface displays or variable displays with moving pictures such as an LED or other similar device.

In another aspect the expandable kiosk structure provides a utility or public service function. In one aspect the expandable kiosk structure functions as a lighting element or as a part of an architectural arrangement. For example, the lighting functionality of the expandable kiosk structure, preferably when the expandable kiosk structure is in a collapsed configuration, can take the place of or augment conventional lighting devices such as street lamps and/or other lighting used in public spaces.

This public service functionality is not limited to lighting. The kiosk may further contain or further function to provide a security service through, for example, CCTV or audio listening devices that are inter-networked with a police or public service control unit to monitor public gatherings for crowd control and safety. Other functionality may include display surfaces or display hardware that permits decoration for festivities and/or local holidays.

Figure 1:
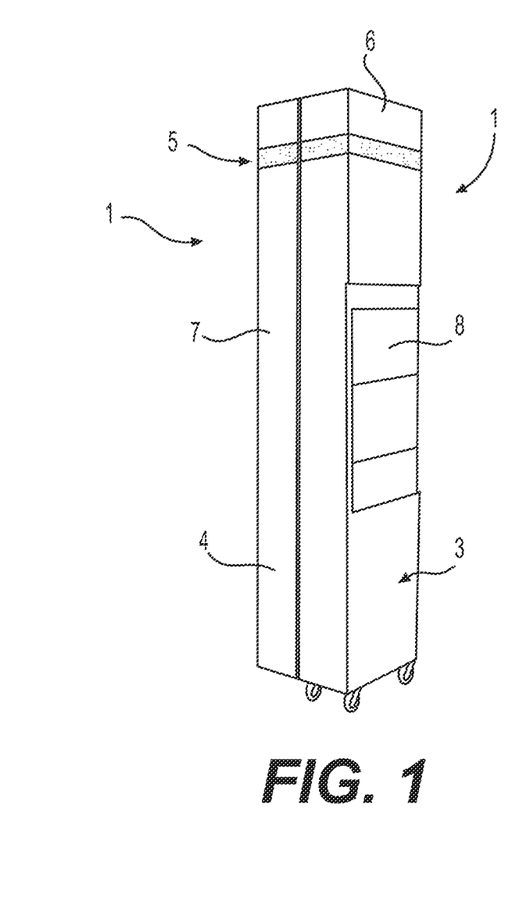
FIG. 1 shows a perspective view of one aspect of the disclosure in a collapsed or retracted form.
Figure 2:
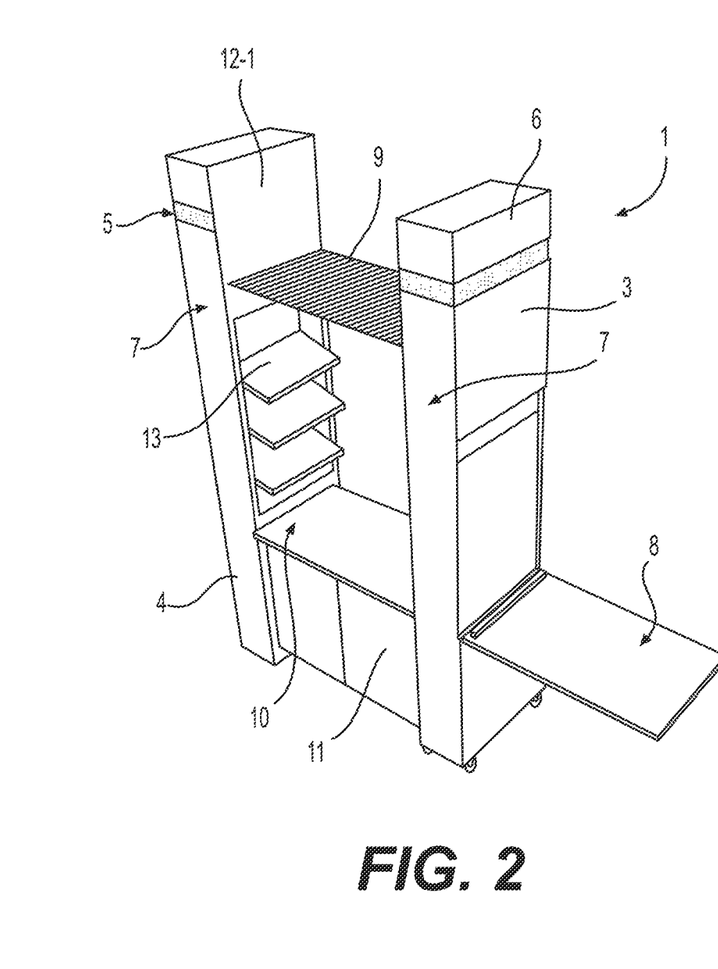
FIG. 2 shows a perspective view of one aspect of the present disclosure in an expanded or deployed form with a collapsible side table and interior utility features.

FIGS. 1 and 2 show perspectives of one aspect of the expandable kiosk structure. FIG. 1 shows the kiosk structure in a collapsed, closed or retracted form whereas FIG. 2 shows the expandable kiosk structure in an expanded, open or deployed configuration. It is readily evident that when in a collapsed form the expandable kiosk structure does not provide the working surface space and/or the canopy space that is provided when the kiosk is in an expanded arrangement as shown in FIG. 2.

FIG. 1 shows a front perspective of the kiosk structure. A front-facing surface is represented by 7 and a first side-facing surface is represented by 3. The kiosk structure 1 is presented in two portions structural unit 6 and structural unit 4 that are contacting one another in FIG. 1. A lighting element is 5 provided at the top of the kiosk structure. In its collapsed or closed form the expandable kiosk structure represents a rectangular column. Other shapes are possible.

In other embodiments of the invention the structural units 4 and 6 may instead be cylindrical or have curved or shaped surfaces. Preferably the structural units 4 and 6 are rectangular for ease of maintenance, collapsing and for providing a visually pleasing architectural element. Additional surfaces not shown in the front-facing perspective of FIG. 1 represent a second side-facing surface (i.e., opposite the side-facing 3) and a back-facing surface that is opposite of the front-facing surface 7. Any of the surfaces that are front- or side-facing may be used as a display surface. It is especially desirable to use an outwardly-facing surface of a display surface 8 with a strongly contrasting image or message. When the expandable kiosk structure is in its completely collapsed form the display surface which is an exterior surface 8 is shown.

FIG. 2 shows additional aspects of the expandable kiosk structure in its expanded, open or fully deployed configuration. A canopy 9 that connects first and second structural units 4 and 6 of the expandable kiosk structure is located in an upper or top portion of the kiosk structure. The canopy structure 9 is preferably hingeably or pivotally attached to either or both structural units 4 and 6. The canopy structure 9 provides shade and/or temporary storage space while the expandable kiosk structure is in an expanded or open configuration. The canopy 9 may be an impervious solid structure that provides reliable and dense shading or alternately may be a mesh material or screen that provides lighter shading.

The display surface 8 is also pivotally or hingeably attached to the structural unit 6. When the expandable kiosk structure is in an expanded form the display surface 8 folds down to provide a stable working or display surface. An additional working surface 10 that is likewise hingeably or pivotally attached to structural units 6 and 4 is provided at a lower portion of the structural units 6 and 4. The working surface 10 and the display surface 8 can be made from a variety of materials but are preferably impervious and easy to clean. The working surface 10 may further be equipped or include a sink-type receptacle or other receptacle for capturing liquid or solid wastes.

A front-facing surface 11 is also provided. This surface may likewise be used for display and/or advertisement purposes. The perspectives and elevations shown in FIGS. 1 and 2 are front-facing because the front-facing surface 11 is closest to the front-facing surface defined by 7. As a front-facing perspective this side of the expandable kiosk structure is preferably the interaction point with the customer or member of the public. The opposite or rear-facing side of the kiosk (not shown in FIGS. 1 and 2) is also a preferred location and orientation of a vendor or individual whose desire or function is to interact with members of the public and/or a target customer group. Other inside-facing surfaces such as 12-1 and an opposing inside-facing surface not shown in FIG. 2 is directly opposite 12-1 may be further functionalized with a storage or display component 13. In one embodiment at least one of the first and the second vertically-oriented structural units includes one or more shelves mounted on an inside-facing surface. In a further embodiment at least a portion of the shelves are mounted at any height on one vertically oriented structure and have a recess located at the same height on the opposite side of the other vertically oriented structure.

Figure 3:
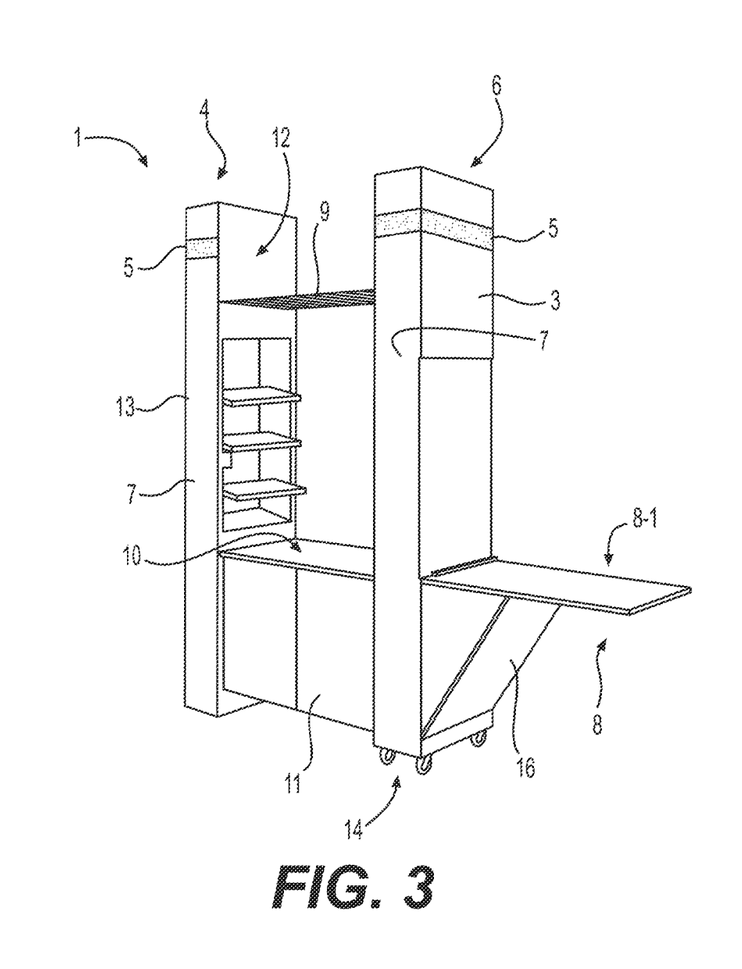
FIG. 3 shows a street-level perspective of an aspect of the present disclosure in an expanded or deployed form including a portion having wheels and/or a sliding system and a portion that may be permanently anchored.
Figure 4:
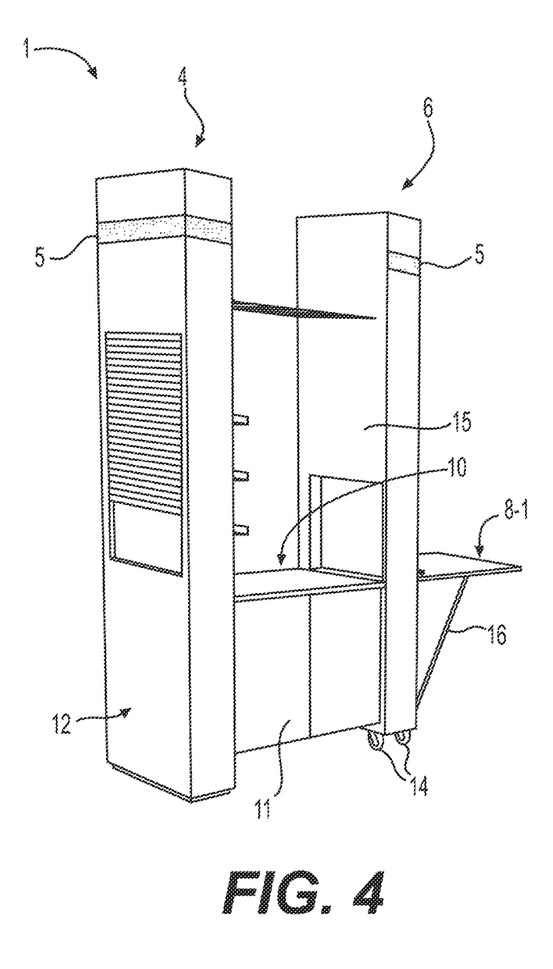
FIG. 4 shows a street-level perspective of an aspect of the present disclosure in an expanded or deployed form showing an outer-face of an exterior portion.

FIGS. 3 and 4 describe street-level perspective views of the expandable kiosk structure. FIG. 3 shows a street-level perspective from an orientation such that the first side-facing surface 3 is exposed. FIG. 4 shows a street-level perspective of the expandable kiosk structure an angle such that the second side-facing surface 12 of the structural unit 4 is exposed.

FIGS. 3 and 4 also show the presence of casters, a rolling mechanism and/or Wheels at the bottom end of the structural unit 6. FIGS. 3 and 4 show a plurality of wheels or casters. The number of wheels or casters can be adapted as needed and may he as few as one or as many as ten. In one embodiment a single wide wheel extends from the front-facing surface 7 of the structural unit 6 to a back-facing surface of the structural unit 6. A single wheel having dimensions such that the width of the wheel is greater than the height of the wheel or alternately a wheel having a width less than a height provides a single point of contact with a surface upon which the wheel rests. The rollers or casters 14 reduce friction and elevate portions of the kiosk 1 from a surface on which the expandable kiosk structure is positioned. Typically the expandable kiosk structure is positioned on a hardened non-natural surface such as poured concrete, brick or tile.

Another aspect of the invention relates to a kiosk system that includes the kiosk 1 in addition to one or more of a rail or guide for the casters, wheels or rolling mechanism such as those described as 14 in FIGS. 3 and 4, and resting recesses in the substrate that is below the kiosk 1 upon which the expandable kiosk structure is located. Recesses and/or depressions the hardened surface on which the expandable kiosk structure 1 is located provide a means of temporarily or permanently anchoring the structural unit 6 in place to avoid unwanted movement thereof during deployment or expansion. In a preferred embodiment the substrate on which the expandable kiosk structure 1 is positioned has recesses or wells into which the casters or wheels roll and are naturally held in place by friction and gravity. In other embodiments of the invention in which the expandable kiosk structure s a part of a system including a temporary anchoring point, the positioning structure of the substrate may include one or more bumps, convexes or berms over which wheels are first rolled and which prevent unintended back travel of the wheels and/or inadvertent or unintended collapsing of the expandable kiosk structure.

FIG. 4 also shows an inside-facing surface 15 of the structural unit 6. The inside-facing surface 15 is directly opposite and substantially parallel to the inside-facing surface 12 of the structural unit 4. In a preferred embodiment of the invention one or more of the structural unit 4 or 6 includes a lip that is generally along with the perimeter of the inside-facing surfaces 12 and/or 15. Even more preferably the lip includes a compressible gasket of a material such as an elastomer or polyurethane that is compressed When the kiosk 1 is in a collapsed or closed position such that the gasket and/or seals on the perimeter lip are in direct contact and compress one another, or are compressed with an opposite inside-facing surface of structural unit 4 or 6. A gasket or seal in place in this manner helps reduce the ingress of insects and otherwise maintains a stable environment within the kiosk 1 when it is in a stored, collapsed, closed or non-deployed position.

FIGS. 3 and 4 also show a folding surface member 16 that is pivotally or hingeably attached to the structural unit 6. Although not shown in FIG. 3 or 4 the kiosk 1 may further contain a similar hingeably or pivotally attached surface on the second side-facing surface 12 of the structural component 4. The purpose of the folding side-facing surface 16 is to provide a support for the horizontal surface 8-1 which is otherwise in a stored configuration lying flat with the first side-facing surface 3 of the structural unit 6. When the horizontal surface 8-1 is deployed it rests on an edge of the surface member 16 to thereby provide a convenient and easily deployable side-facing surface that acts as a display or serving surface when in a deployed condition.

Preferably the display surface and surface member 8 and 16 are in direct contact with one another when in a stored position; namely, surface member 16 is hingeably closed with a hinge at the bottom portion of the structural unit 6 such that it folds upwardly against the surface 3 whereas display surface 8 (and opposite horizontal surface 8-1), which is also hingeably or pivotally attached to the outside-facing surface 3 of the structural unit 6, is hinged or pivotally attached such that it folds downwardly to cover the surface 16 in a stowed or storage state.

Figure 5A:
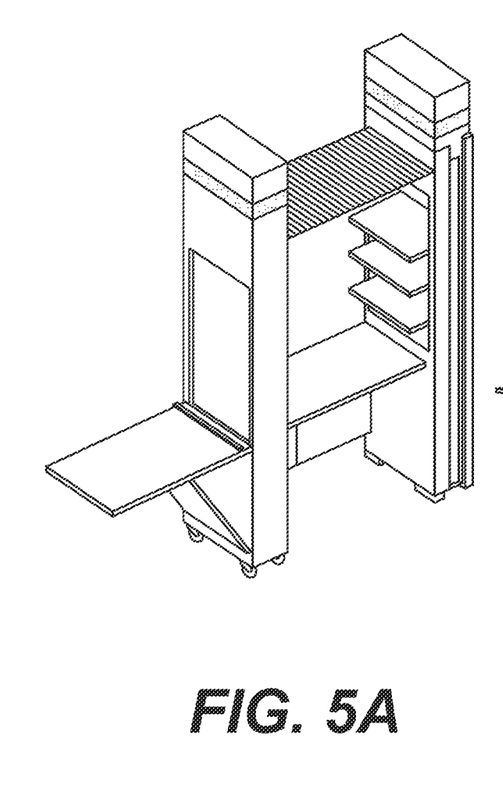
FIG. 5A shows a high view elevation of one aspect of the present disclosure in an expanded or deployed form showing a canopy surface, a retail or working surface, and a display surface.
Figure 5B:
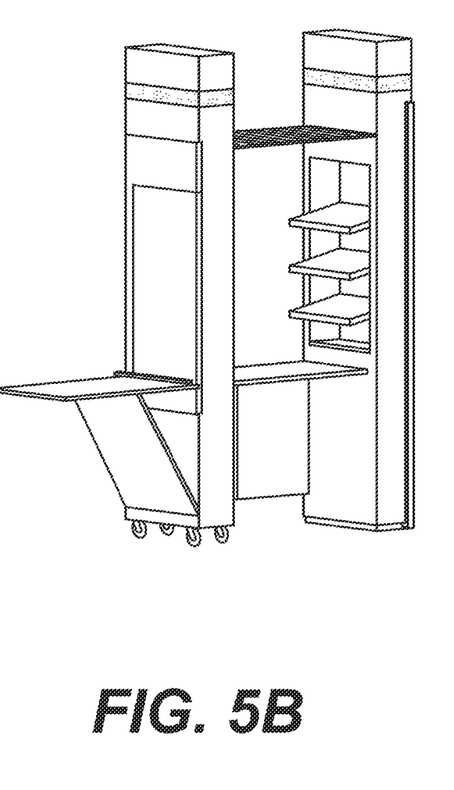
FIG. 5B shows a street-level perspective of an aspect of the present disclosure in an expanded or deployed form from the rear of the structure from the view of a vendor.
Figure 5C:
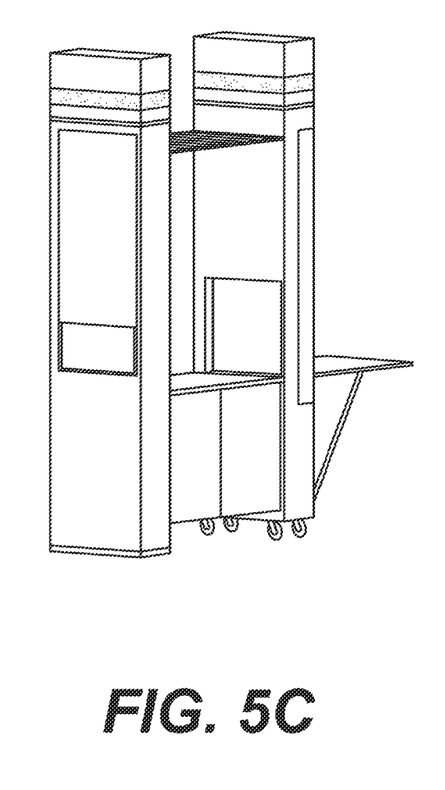
FIG. 5C shows a customer-facing perspective of an aspect of the present disclosure in an expanded form.

FIGS. 5A, 5B and SC describe orientations of surfaces of the kiosk. FIG. 5A and FIG. 5B are a street-level perspective from a rear-facing orientation, e.g., an orientation showing the view of a vendor or a staff member who is acting in the retail trade or government service utilizing the kiosk 1. Generally, the inside-facing surfaces are parallel with one another as are the inside-facing surfaces of the canopy 9 and the working surface 10. A near parallel arrangement of such surfaces promotes ease of expansion and solid when the kiosk 1 is deployed in a fully expanded position for operation. FIG. SC shows a street-level perspective of the kiosk 1 from a front view perspective.

The dimensions of the structural units 4 and 6 are selected such that the kiosk is able to effectively carry out the function of a retail location and, concurrently or separately, a utility function such as a light post or display architectural feature. The height of structural components 4 and 6 is approximately 3 meters and can range from a height of 1 meter to 3.5 meters, preferably 2 meters to 3 meters, more preferably about 2.5 meters. The width of structural units 4 and 6 is substantially less than the height and ranges from about 0.25 to 1.5 meters, preferably 0.50 to 1.25, preferably about 1 meter. The width of the structural units 4 and 5 as reflected in the width of the front-facing surface 7 may vary from 0.1 to 1 meter, preferably 0.2 to 0.8 meters, more preferably about 0.5 meters. When in a collapsed configuration the width of the kiosk 1 is approximately two times the width of the front-facing surfaces 7, e.g., from 0.4 to 2.5 meters, preferably 0.6 to 2 meters, preferably 0.5 to 1.5 meters or about 1 meter. The width of the kiosk 1 when in a collapsed or stowed position is slightly more than the width of only the front-facing surface 7 if the inside-facing surfaces 12-1 and 15 are equipped with a lip and corresponding gasket which may otherwise add an amount of 0.1-0.5 times the width of one of the front-facing surfaces 7. When deployed or in an expanded position such that the canopy 9 and the working surface 10 are in a roughly parallel orientation, the width of the kiosk, without any width attributable to the deployed display surface 8, is about 3 meters, preferably from 1 to 4 meters, from 1.5 to 3.5 meters, from 2 to 3 meters, or about 2.5 meters. Deployment of the display surface 8 provides a further extension of up to 1.5 meters, preferably 1 meter, preferably 0.5 meters of a surface that is roughly parallel with and in the same general axis of the working surface 10.

Figure 6:
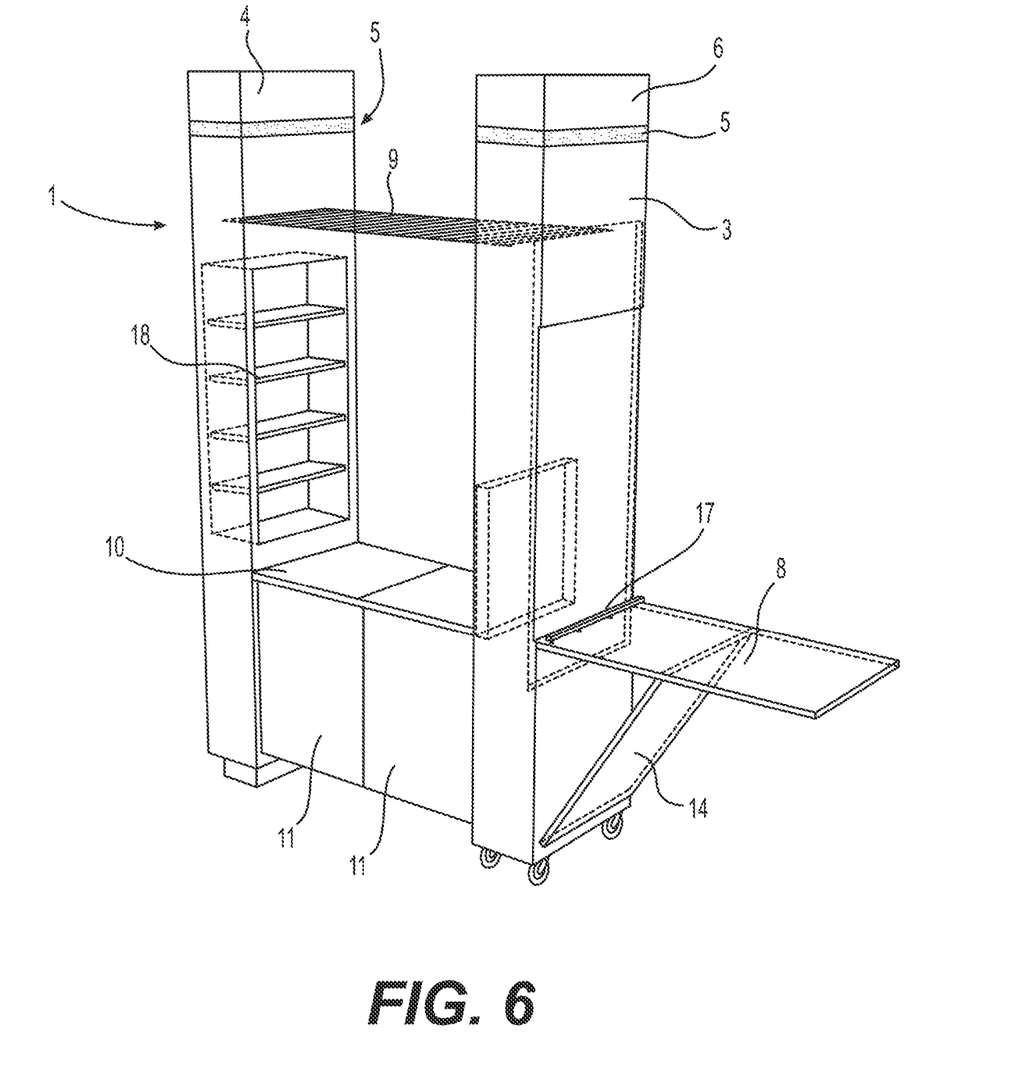
FIG. 6 shows a line drawing of an aspect of he present disclosure in an expanded form.

FIG. 6 shows an aspect of the invention in which the kiosk 1 is in a fully deployed or expanded state. FIG. 6 shows the differences between the structural units 4 and 6. The structural unit 4 is an anchored column that is permanently or fixably attached to a substrate surface at the bottom. Preferably the structural unit 4 is immovably attached or anchored to a substrate surface such as a poured concrete surface. In this sense the structural unit 4 can be removed to a different location only by, for example, a substantial detachment mechanism such as bolts or a welded joint. The structural unit 4 contrasts with the structural unit 6 which is a movable component. Preferably the structural unit 6 is movable only along an axis that is in line with the inside-facing surfaces 12-1 and 15 of the structural units 4 and 6, respectively. Although the wheels or castors 14 may be rotatable in any direction, castors or wheels that are capable of rotation only along an axis defined by the inside-facing surfaces 12-1 and 15 are sufficient.

The fixed structural unit 4 may include one or more utility conduits located within the structural unit 4. For example, one or more electrical lines, sewer lines, gray water lines, fresh water, heated and/or cooled utility lines may be present within the fixed structural unit 4 where one or more of such utility lines is wired or connected to an underground corresponding utility line for, for example, a supply of electricity, water or water disposal (sewer). Preferably the structural unit 4 includes only one or both of an electrical line and a water supply line. The electrical line provides electricity to the lighting element 5 on the structural units 4 and 6. In addition an electrical line may be used to power one or more heating or cooling units that are likewise enclosed in the structural unit 4 and/or the structural unit 6. If any electrical demand is required from the structural unit 6 (including any lighting element 5) an electrical line may run between structural units 4 and 6 at one or more locations such as on top of the canopy 9 or beneath the working surface 10.

The front-facing surface 11 provides a support for the working surface 10. When in a deployed state the working surface 10, which is hingeably attached to one or more of the inside-facing surfaces 12-1 or 15, rests at least partially on a perimeter of the front-facing surface 11. The front-facing surface 11 is deployable by folding out from the collapsed kiosk 1. Preferably the front-facing surface 11 represents two panels that are separately hingeably or pivotally attached to the inside-facing surfaces 12-1 and 15 of structural units 4 and 6, respectively.

The structural unit 4 may include a cooler and/or heater 16-1. Preferably a corresponding mechanical portion to generate cold or heat is included within the confines of the structural unit 4.

A handle 17 may be included on the side-facing surface 3 of the structural unit 6. The handle 17 functions to permit a vendor to apply gentle and even pulling force on the structural unit 6 so as to disengage from the structural unit 4 and expand or deploy the kiosk 1 to an open or vending-oriented position.

Figure 7A:
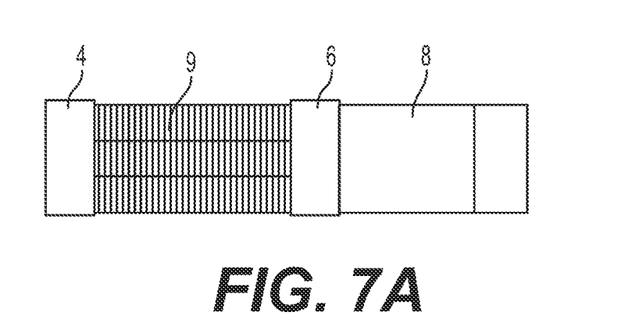
FIG. 7A shows the collapsible, retractable and/or draw down functionality of an aspect of the present disclosure.
Figure 7B:
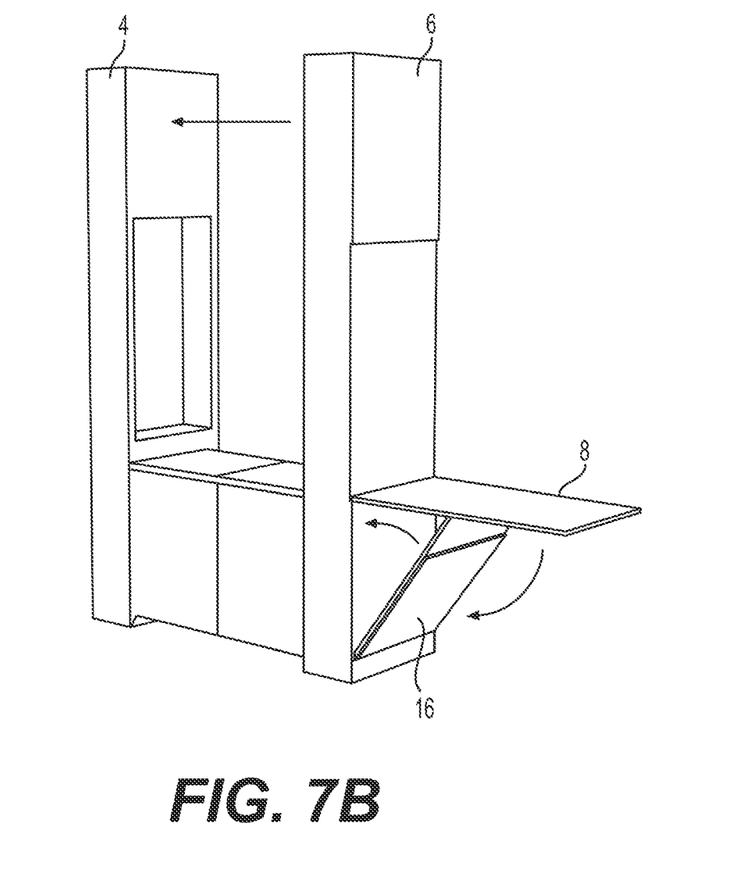
FIG. 7B shows an aspect of the present disclosure at a beginning stage of collapsing.

FIG. 7Aa shows a top view of the kiosk 1 in a deployed or expanded state. The canopy 9 is between the structural units 4 and 6 and the horizontal surface 8-1 is connected to the structural unit 6. FIG. 7B identifies and characterizes the first step taken in order to stow or collapse the kiosk 1. As a first step the horizontal surface 8-1 is folded to the structural unit 6 and placed in a stowed position. Either or both of these surfaces may also include a hinging mechanism or other securing mechanism to keep the portions in place during collapsing.

Figure 8A:
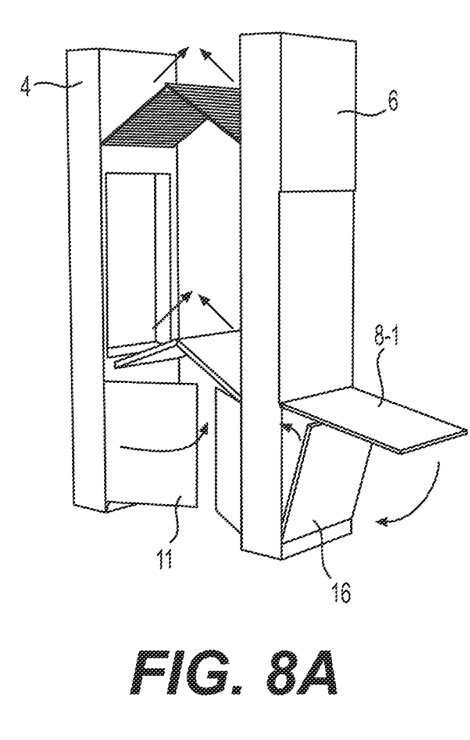
FIG. 8A shows a step of closing an aspect of the present disclosure.
Figure 8B:
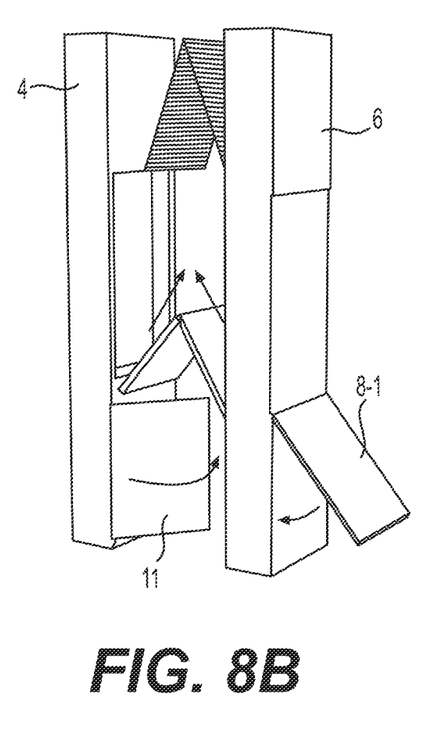
FIG. 8B shows a step of closing an aspect of the present disclosure.
Figure 8C:
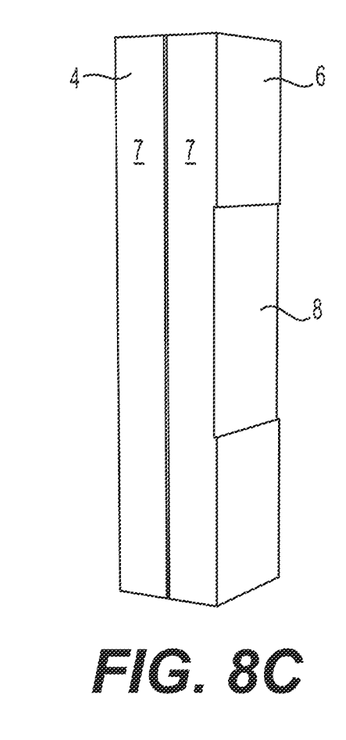
FIG. 8C shows a step of closing an aspect of the present disclosure.

The second step towards achieving complete collapse and stowage of the kiosk 1 is to push structural unit 6 towards structural unit 4. FIG. 8A shows the effect of a closing force in structural unit 6. As structural unit 6 is moved towards structural unit 4, the canopy 9 which is hingeably attached to one or more of the inside-facing surfaces 12-1 and 15 of the structural components 4 and 6 respectively, moves upward (or downward) in a folding motion. At the same time the working surface 10 which is likewise hingeably attached to one or more of the inside-facing surfaces 12-1 or 15 is folded upwards while the outside-facing surface 11 is folded inwards, preferably by separately folding in two panels each of which are vertically hingeably or pivotally attached to the inside-facing surfaces 12-1 and 15 of the structural units 4 and 6. Once the surfaces 9, 10 and 11 are moved inwards or brought into a proper folding orientation, structural unit 6 may be further moved towards the inside-facing surface 12-1 of structural component 4. Further movement compresses the canopy 9, the working surface 10 and permits the panels representing the outside-facing surface 11 to reliably and gently move to stowed positions. In a final and full closed position none of the canopy 9, the working surface 10, the horizontal surface 8-1 (or alternately the display surface 8) or the front-facing surface 11 is evident (see FIG. 8C).

In other embodiments the conduit present in the fixed structural unit 4 may further include one or more information lines for carrying or sending data. An information line may be networked with one or more of a cash register or inventory-surveillance devices present in or around the kiosk 1. In a still further embodiment the kiosk 1 is equipped with a motor that powers wheels or castors 14 and permits an automated or powered closure and opening of the kiosk 1.

The kiosk is preferably equipped with one or more locking mechanisms that are accessible from either the front-facing surfaces of the collapsed kiosk or the rear-facing surface of the collapsed kiosk. A locking mechanism functions to prohibit unauthorized opening or deployment of the kiosk. Preferably the locking mechanism is accessible from the rear-facing surface.

The invention claimed is:

1. An expandable kiosk structure, comprising:
a first vertically-oriented structural unit and a second vertically-oriented structural unit, wherein the first and second vertically-oriented structural units have inside-facing surfaces parallel to one another,
a canopy pivotally or hingeably affixed to at least one inside-facing surface of the first vertically-oriented structural unit, the second vertically-oriented structural unit, or both the first vertically-oriented structural unit and the second vertically-oriented structural unit,
a working surface hingeably attached to at least one of the inside-facing surfaces of the first vertically-oriented structural unit, the second vertically-oriented structural unit, or both the first vertically-oriented structural unit and the second vertically-oriented structural unit, wherein the working surface is disposed beneath the canopy and rests on a front-facing surface that is vertically hingeably attached to the inside-facing surfaces of the first and second vertically-oriented units,
wherein the first vertically-oriented structural unit is permanently attached to a substrate and the second vertically-oriented structural unit is mounted on a rolling mechanism so that the second vertically-oriented structural unit may be moved away from the first vertically-oriented structural unit to a distance equivalent to a deployed length of the canopy and a deployed length of the working surface,
a lighting component mounted inside and at the top of the first and the second vertically-oriented structural units, wherein the lighting component is electrically connected to an electrical source passing through the first vertically-oriented structural unit and extends around the periphery of the expandable kiosk structure when the first and the second vertically-oriented structural units are in a fully retracted configuration and the expandable kiosk structure represents a rectangular column,
a second working surface hingeably attached to an outside-facing surface of at least one of the first and the second vertically-oriented structural units and deployable by resting on a third deployable surface pivotally or hingeably attached to an outside-facing surface of the first or second vertically-oriented structural units.

2. The expandable kiosk structure of claim 1, wherein the canopy is hingeably or pivotably foldable at a center portion thereof and the working surface is hingeably or pivotably foldable at a center portion thereof.

3. The expandable kiosk structure of claim 1, wherein the first vertically-oriented structural unit includes a utility supply line that provides electricity, sanitary, and water supply line that provide services to the working surface, a basin present in the working surface, or both the working surface and a basin present in the working surface.

4. The expandable kiosk structure of claim 1, wherein at least one of the first and the second vertically-oriented structural units includes one or more shelves mounted on an inside-facing surface.

5. The expandable kiosk structure of claim 4, wherein at least a portion of the shelves are mounted at any height on one vertically-oriented structure and have a recess located at the same height on the opposite side of the other vertically-oriented structure.

6. The expandable kiosk structure of claim 1, wherein the rolling mechanism includes wheels that rotate in axial alignment with the inside-facing surfaces of the first and the second vertically-oriented structural units.

* * * * *